United States Patent
Takahashi et al.

(10) Patent No.: US 6,361,827 B1
(45) Date of Patent: Mar. 26, 2002

(54) METHOD OF IMPARTING WATER RESISTANCE TO MOLDED POLYSACCHARIDE

(75) Inventors: Koji Takahashi, Kanagawa; Makoto Hattori, Tokyo; Hidekazu Takahashi; Toshiyuki Kaneko, both of Chiba, all of (JP)

(73) Assignee: Showa Sangyo Co., Ltd., Tokyo (JP)

( * ) Notice: Subject to any disclaimer, the term of this patent is extended or adjusted under 35 U.S.C. 154(b) by 0 days.

(21) Appl. No.: 09/582,338

(22) PCT Filed: Dec. 25, 1998

(86) PCT No.: PCT/JP98/05907

§ 371 Date: Jun. 23, 2000

§ 102(e) Date: Jun. 23, 2000

(87) PCT Pub. No.: WO99/33905

PCT Pub. Date: Jul. 8, 1999

(30) Foreign Application Priority Data

Dec. 26, 1997 (JP) ............................................. 9-366664

(51) Int. Cl.$^7$ .............................. B05D 5/10; A61K 9/14
(52) U.S. Cl. ...................... 427/207.1; 527/300; 527/12; 427/322; 424/485; 424/488
(58) Field of Search ................................. 527/300, 312; 427/207.1, 322; 424/485, 488

(56) References Cited

U.S. PATENT DOCUMENTS

| | | | |
|---|---|---|---|
| 2,331,715 A | | 10/1943 | Nadeau et al. |
| 4,137,300 A | | 1/1979 | Sheth et al. |
| 4,888,171 A | | 12/1989 | Okonogi et al. |
| 4,937,270 A | | 6/1990 | Hamilton et al. |
| 5,077,053 A | * | 12/1991 | Kuncewitch et al. ....... 424/441 |
| 5,098,718 A | | 3/1992 | Ardaillon et al. |
| 5,182,130 A | * | 1/1993 | Haralampu et al. ............ 427/3 |
| 5,500,227 A | | 3/1996 | Oshlack et al. |
| 5,643,667 A | | 7/1997 | Tsukioka |
| 5,705,207 A | * | 1/1998 | Cook et al. .................... 426/89 |
| 5,733,638 A | | 3/1998 | Tsukioka |

FOREIGN PATENT DOCUMENTS

| | | |
|---|---|---|
| EP | 0 090 559 | 3/1983 |
| EP | 0 710666 A1 | 5/1996 |
| JP | S53-5270 | 1/1978 |
| JP | S53-26318 | 3/1978 |
| JP | S53-38646 | 4/1978 |
| JP | S57-174090 | 10/1982 |
| JP | S58-193646 | 11/1983 |
| JP | S59-220175 | 12/1984 |
| JP | S60-221078 | 11/1985 |
| JP | S60-248158 | 12/1985 |
| JP | S61-141862 | 6/1986 |
| JP | S63-101319 | 6/1988 |
| JP | H3-65145 | 3/1991 |
| JP | H3-502704 | 6/1991 |
| JP | 03 207775 A | 9/1991 |
| JP | H4-28768 | 1/1992 |
| JP | 06024963 A | 7/1992 |
| JP | H4-297414 | 10/1992 |
| JP | H4-334317 | 11/1992 |
| JP | H4-364123 | 12/1992 |

(List continued on next page.)

OTHER PUBLICATIONS

Kuo et al, Bioconjugate Chem., 2:232–241 (1991).
Hattori et al., Bioscience, Biotech., Biochem., 58(1): 174–177 (1994).

(List continued on next page.)

*Primary Examiner*—Samuel A. Acquah
(74) *Attorney, Agent, or Firm*—Wolf, Greenfield & Sacks, P.C.

(57) ABSTRACT

A method of imparting water resistance to a molded polysaccharide having poor water resistance because of its high hydrophilicity, which comprises bonding a prolamin such as zein to the surface of the molded polysaccharide.

10 Claims, 1 Drawing Sheet

FOREIGN PATENT DOCUMENTS

Figure 1:
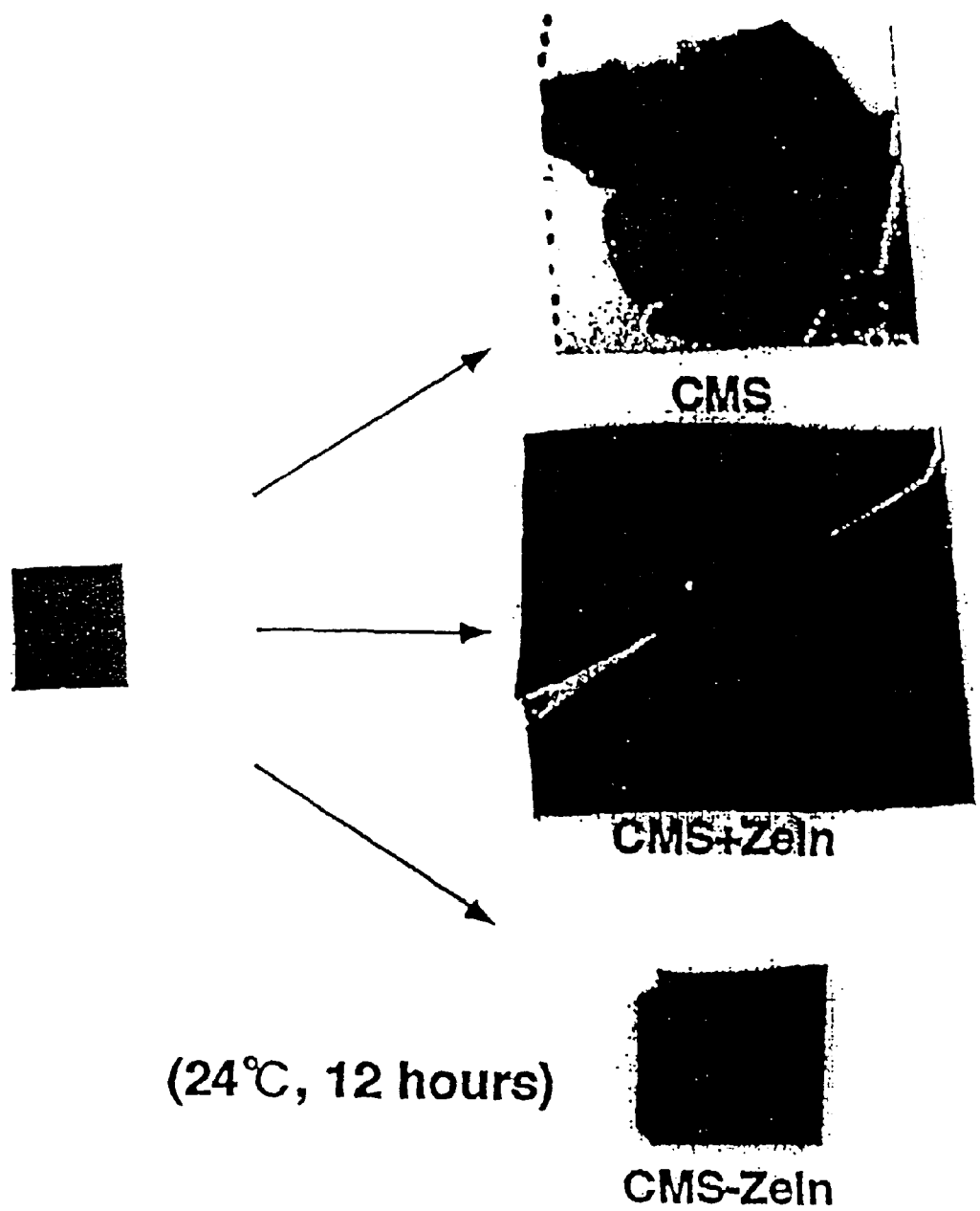

| | | |
|---|---|---|
| JP | H5-23117 | 2/1993 |
| JP | H5-186335 | 7/1993 |
| JP | H5-186337 | 7/1993 |
| JP | H5-221859 | 8/1993 |
| JP | H5-230101 | 9/1993 |
| JP | 05 239244 A | 9/1993 |
| JP | 06 125718 A | 5/1994 |
| JP | 06133735 A | 5/1994 |
| JP | 06 135487 A | 5/1994 |
| JP | 06284875 A | 10/1994 |
| JP | 06303902 A | 11/1994 |
| JP | 07032610 A | 2/1995 |
| JP | H7-231756 | 9/1995 |
| JP | H7-252140 | 10/1995 |
| JP | 07327634 A | 12/1995 |
| JP | H8-23975 | 1/1996 |

OTHER PUBLICATIONS

Yang et al., Bioscience, Biotech., Biochem., 59(12): 2203–2206 (1995).

Hattori et al., J. Agric. Food Chem., 43:2007–2011 (1995).

Shimashita, M., "Chemically Modified Starches," *Denpun Kagaku*, 38:55–63 (1991).

Hoare and Koshland, "A Method for the Quantitative . . . ," *J of Biol Chem*, 242(10):2447–2453 (1967).

Kounosuke, et al., Patent abstracts of Japan, vol. 17, No. 704 (C–1146), Dec. 22, 1993.

Author Unnamed—Derwent Publications, Ltd., XP002154872, "Biodegradable foamed moulding for food container . . . " May 17, 1994.

Author Unnamed—Derwent Publications, Ltd., XP002154873, "Coating material used as paint, ink, . . . " Sep. 11, 1991.

Author Unnamed—Derwent Publications, Ltd., XP002154874, "Biodegradable moulding for container or . . . " May 10, 1994.

* cited by examiner

METHOD OF IMPARTING WATER RESISTANCE TO MOLDED POLYSACCHARIDE

TECHNICAL FIELD OF THE INVENTION

The present invention relates to a process for imparting a water resistance to molded polysaccharide.

BACKGROUND ART

According to aggravation of an environmental pollution by waste, plastic (a polymer compound and its combination substance) which is degradable to low molecular weight compounds by microorganisms in the natural world is called a biodegradable plastic and has been noted.

Since a natural polysaccharide such as starch is excellent as a raw material for a biodegradable plastic in stability, steady supply, low cost and the like, its utilization has been examined. However, there remains several problems in order to enlarge its application, and as one of them is cited the point that a lot of natural polysaccharides having poor water resistance due to their high hydrophilicity.

If these defects can be overcome with a low cost, the function and value of a natural polysaccharide as a biodegradable plastic can be improved remarkably.

Further, a technology to change the property of polysaccharide by bonding the amino group of amino acid or protein to polysaccharide having the carboxyl group is known.

1:
JP, T, H3-502704 (U.S. Pat. No. 4,937,270)

A water insoluble biocompatible gel is prepared by the introduction of an aminoester to hyaluronic acid by forming an amide bond with carbodiimide as a catalyst.

2:
JP, A, H8-23975 (EP, A, 710,666)

A polymer carbodiimide compound is carried on a surface of a base material (including a natural polymer like polysaccharide) and fixed with a biologically active substance (including protein with a physiological activity).

3:
Bioconjugate Chem., 2, 232–241 (1991)

A reaction mechanism and a product in case of modifying hyaluronic acid chemically with a primary amino acid using carbodiimide are reported.

4:
Biosci. Biotech. Biochem., 58, 174–177 (1994)
Biosci. Biotech. Biochem., 59, 2203–2206 (1995)
J. Agric. Food Chem., 43, 2007–2011 (1995)

Physicochemical properties and enzyme reactivities of bonded products in a combination such as lysozyme and carboxymethyl dextran, amino acid and carboxymethyl starch, or milk protein and carboxymethyl starch, by the use of 1-ethyl-3-(3-dimethylaminopropyl) carbodiimide as the carbodiimide are reported. In the report, it is reported that the bonded products obtained decrease in a water absorption property and the solubility in water.

On the other hand, it is also considered that a carboxyl group of amino acid or protein is bound with polysaccharide having an amino group.

However, in the prior art a technology for imparting water resistance as to a molding consisting of polysaccharide by chemically bonding amino acid, peptide or protein to its surface has not been known at all.

Further, prolamin is protein mainly contained in grain, and has a unique property as protein that it is insoluble in water and a salt solution and soluble in alcohol containing water and acetone containing water. As prolamin are known, for example, gliadin in wheat, hordein in barley, zein in corn, and the like. In particular as to zein, it is known that a coated membrane which is excellent in properties such a water-resistance, acid-resistance, thermal resistance, electrical insultion, antioxidizing, digestive enzyme-resistance (enteric solubility), deodorant, adhesion, and biodegradation properties is formed when coating a zein solution in an alcohol of 1–4 carbon atoms or acetone on surface of an object for treating material by means such as spraying, coating, or dipping.

By utilizing these properties are considered technologies on a prolamin membrane by various zeins in a food field (JP, A, S53-38646, JP, A, S58-193646 (EP, A, 90559), JP, A, S60-248158, JP, A, H4-297414 (U.S. Pat. No. 5,077,053), JP, A, H5-23117, JP, A, H4-28768, JP, A, H6-303902, JP, A, H6-284875, JP, A, H7-32610, JP, A, H7-327634, JP, A, H7-231756 (U.S. Pat. Nos. 5,643,667 and 5,733,638) and the other fields such as a medicinal field (JP, A, S53-26318 (U.S. Pat. No. 4,137,300), JP, A, S59-220175, JP, A, S60-221078 (U.S. Pat. No. 4,888,171), JP, A, S61-141862, JP, A, S63-101319, JP, A, H3-65145 (U.S. Pat. No. 5,098,718), JP, A, H4-364123, JP, A, H4-334317, JP, A, H5-186335, JP, A, H5-186337, JP, A, H5-221859, JP, A, H6-24963, JP, A, H6-133735, JP, A, H7-252140 (U.S. Pat. No. 5,500,227).

However, in the past, a technology for imparting water resistance to said molding by chemically bonding prolamin such as zein to surface of a molded polysaccharide was not known at all.

Nevertheless, owing to the point that a lot of natural polysaccharides having poor water resistance due to their high hydrophilicity, there has been restriction of their utilization.

The invention has the aim for imparting water resistance to a molded polysaccharide which having poor water resistance due to its high hydrophilicity.

DISCLOSURE OF THE INVENTION

As a result of extensive studies to solve the above problems, the inventors found that bonding chemically prolamin such as zein to a surface of a molded polysaccharide which having poor water resistance due to its high hydrophilicity can impart water resistance, further continued the studies, and have thus accomplished the invention.

Namely, the invention is as follows.

1. A process for imparting water resistance to a molded polysaccharide by bonding a prolamin to a surface of the molded polysaccharide.

2. A process for imparting water resistance to a molded polysaccharide according to claim 1, wherein the polysaccharide contains a functional group with a prolamin bonding property.

3. A process for imparting water resistance to a molded polysaccharide according to claim 2, wherein the functional group with a prolamin bonding property is a carboxyl group.

4. A process for imparting water resistance to a molded polysaccharide according to claim 2, wherein the functional group with a prolamin bonding property is an amino group.

5. A process for imparting water resistance to a molded polysaccharide according to claims 1, 2, 3 or 4, wherein the polysaccharide is starch.

6. A process for imparting water resistance to a molded polysaccharide according to claims 1, 2, 3, 4 or 5, wherein the bonding of prolamin is carried out in the presence of carbodiimide.

7. A process for imparting water resistance to a molded polysaccharide according to claims 1, 2, 3, 4, 5 or 6, wherein the bonding of prolamin is carried out in an alcohol of 1–4 carbon atoms or acetone solutions of prolamin.

8. A process for imparting water resistance to a molded polysaccharide according to claims 1, 2, 3, 4, 5, 6 or 7, wherein prolamin is zein.

9. A process for imparting water resistance to a molded polysaccharide according to claims 1, 2, 3, 4, 5, 6, 7 or 8, wherein the alcohol or acetone contains water.

10. A process for imparting water resistance to a molded polysaccharide according to claims 1, 2, 3, 4, 5, 6, 7, 8 or 9, wherein the alcohol is ethanol.

As described above, imparting water resistance by prolamin such as zein was generally made in the past by coating with prolamin such as zein.

On the contrary, in the invention prolamin such as zein is bound to a surface of a molding of polysaccharide having a functional group with a bonding property for prolamin such as zein, in particular a carboxyl group or an amino group, thereby improving the water resistance of said molding.

The bonding amount of prolamin such as zein is about 0.6%, an extremely minute amount. In the invention, regardless of such an extremely minute bonding amount of prolamin such as zein, it was totally an unexpected result that the water resistance could be given to the molded polysaccharide.

As described below, as to a swelling property of a molded polysaccharide by contact with water, a carboxymethyl starch membrane (CMS) or the same membrane but to which zein are allowed to simply contact with starch (hereinafter referred to as "mixed membrane (CMS+Zein)"), swells remarkably, whereas an inventive carboxymethyl starch membrane, to which zein is allowed to chemically bond (hereinafter referred to as "bonded membrane (CMS–Zein)"), swells hardly.

Thus, the fact that CMS membrane and the mixed membrane (CMS+Zein) swell remarkably is considered to be due to a water absorption of starch in said membranes.

On the contrary, in the bonded membrane (CMS–Zein) such swelling is inhibited, and this is considered to be due to the fact that the starch membrane is coated with zein, by the bonding of zein, resulting in the difficulty of a contact between starch and water molecules.

Therefore, it is considered that the unexpected effect of the invention is brought about by a synergistic effect of a chemical aspect in which a stable and tight bonding is formed by a chemical bonding between a functional group with a bonding property for prolamin such as zein in polysaccharide consisting of a surface of a molding, in particular a carboxyl group, and prolamin such as zein, and a physical aspect in which the surface of said molding is coated with bound prolamin molecules such as zein having a water resistance.

Thus, as is evident from the above unexpected effect of the invention it is understandable that there is a special significance in the treatment of prolamin such as zein in the invention.

BRIEF DESCRIPTION FOR DRAWING
[FIG. 1]

The swelling properties of the carboxymethyl starch membrane (CMS), the carboxymethyl starch membrane which is made only contact with zein (CMS+Zein), and the carboxymethyl starch membrane bonded with zein are shown (CMS–Zein).

BEST MODE FOR CARRYING OUT THE INVENTION

In the following the invention is further explained in detail.

Polysaccharides in the invention represent those which are biochemically classified as "polysaccharides" as shown in the following 1–4. Namely, they are those in which monosaccharide is polymerized by a glycoside linkage, and either naturally existing one or one treated chemically or physically either can be used. Polysaccharide existing naturally whose molecule is formed by a regularly repeated structure with a fixed repeating unit has functions as a skeleton, a structural substance, or a storage substance.

1: Homoglycans

They are those which each consist of one kind of structural saccharides, and illustrative of them are, for example, cellulose, starch, pluran, glycogen, dextran, mannan, galactan, fractan, laminan, lichenan, nigeran, pentosan and xylan.

2: Heteroglycans

They are those which each consist of two kinds of structural saccharides, and illustrative of them are, for example, glucomannan, galactomannan, arabinogalactan, arabinoxylan, plant gum (gum arabi, gum tragacanth), mucilagenous substance, seaweed polysaccharides (agar, carrageenan, fucoidin, and the like).

3: Polyuronides

Illustrative of them are, for example, pectic acid, arginic acid, bacteria polysaccharides.

4: Mucopolysaccharides

Illustrative of them are, for example, hyaluronic acid, chondroitin, teichronic acid, corominic acid, chondroitin sulfate, heparin, heparitin salfalfate, kerato sulfate, chitin and chitosan.

As polysaccharide of the invention is used one having in its molecule a functional group with a bonding property to prolamin such as zein. Particularly, one having a carboxyl group or an amino group is preferable. Illustrative of polysaccharides, with the carboxyl group in a natural state, are, for example, pectin, alginic acid, hyaluronic acid, chondroitin, chondroitin sulfate, heparin and heparantin sulfate.

Additionally, as polysaccharide having an amino group can be used one in which the amino group is made free by chemically treating mucopolysaccharide or so, and chitosan in which chitin is deacetylated is appropriate.

Further, one in which the carboxyl group is introduced in a natural polysaccharide maybe used. Illustrative of these are, among, modified starches called in the starch industry (Denpun Kagaku, 38, 55–63, 1991), for example, an oxidized starch, a carboxymethyl starch and a carboxyethyl starch.

Illustrative of moldings, in which the above polysaccarides as starting materials are molded by physical and/or chemical treatments, are, for example, film, sheet, board, particles, beads, tube, mesh, foaming foam, fiber, plate and container. As for the size of moldings there is no restriction.

The bonding reaction of a prolamin bonding group of polysaccharides in the invention to prolamin such as zein, namely in case of letting an acid amide formation reaction occur, is favorably be carried out in the presence of carbodiimide.

As carbodiimide, in particular a N,N'-disubstituted carbodiimide (the general formula RN=CNR') is reactive and preferable. Illustrative of such carbodiimides are, for example, 1-ethyl-3-(3-dimethylaminopropyl)carbodiimide (usually abbreviated as EDC), N,N'-dicyclohexylcarbodiimide, 1-cyclohexyl-3-(2-morpholinoethyl) carbodiimide and N,N'-di-p-toluoylcarbodiimide.

Also, prolamin such as zein is favorably used in a solution state. As solvent in that case can be illustrated alcohols or ketones. An alcohol of 1–4 carbon atoms as the alcohols, particularly ethanol and acetone as the ketones are appropriate, though in that case one containing water to make the solubility of prolamin such as zein most appropriate is preferably used.

Further, in order to bind prolamin such as zein to a surface of a polysaccharide product its surface and prolamin such as zein may be placed in a state where a chemical bonding is formed by contact, and methods such as immersing the polysaccharide product in solution of prolamin such as zein, and coating or spraying the solution of prolamin such as zein on surface of the polysaccharide product can be adopted.

In the following is explained the invention in more detail by way of examples, but it is to be understood that the invention is not limited in any way.

EXAMPLE 1
Preparation of the Carboxymethyl Starch (CMS)

A purified starch of a 13% water content was used which was obtained by suspending a commercially available corn starch in water of 4–5 times' volume, and centrifuging (24° C., 3000 rpm, 15 min) and repeating this procedure 15 times and then air-drying.

Carboxymethylation of the purified starch was carried out in the following.

Monochloroacetic acid 7.0 g was dissolved in methanol 160 ml, whereinto a 50%(W/V) sodium hydroxide solution 14 ml was slowly added in 1 min at 30° C. The purified starch 10 g was dispersed into the obtained alkaline monochloroacetic acid methanolic solution, and reacted under gentle stirring at 40° C. for 48 hrs. The reaction was stopped by neutralization to pH 6.5 with 5M acetic acid, filtered on a G-4 glass filter, thoroughly washed using 60% methanol and pure methanol sequentially, dehydrated, and dried in vacuum for granting CMS.

A substitution degree of the carboxymethyl group was measured by the following hydrochloric acid-methanol titration method.

A dry sample 100 mg was accurately weighed, dispersed in a 2N HCl-70% methanol solution, and shaken for 60 min. The suspension was filtered on a membrane filter of 0.45 $\mu$m, poured with a 70% methanol solution, and washed until a chloride ion in the filtrate could not detected by a qualitative reaction using a silver nitrate solution. After washing, a filtrated residue was quantitatively transferred to a conical flask, dispersed in pure water 150 ml, and completely pasted heating on a boiling water bath. This was cooled to room temperature, and titrated by a 1/40 sodium hydroxide standard solution, using phenolphthalein as an indicator. As a blank the same procedure was carried out for an untreated starch, and the substitution degree of the carboxymethl group per glucose 1000 residues was measured according to the below equation.

$$\text{Substitution degree (\%)} = \frac{(\text{Sample titration amount} - \text{Blank titration amount}) \times 1/40 \times \text{Factor of NaOH standard solution} \times 180}{\text{Sample weight (g)} \times 1.1} \quad \text{Equation 1}$$

According to measurement by the above method, the substitution degree of the above carboxylmethyl starch was 60 residues per glucose 1000 residues.

EXAMPLE 2
Preparation of the Carboxymethyl Starch (CMS) Membrane 2 g of the CMS obtained in the example 1 were dispersed in distilled water 200 ml, made into paste heating around 85° C., and then degassed by evacuating with a vacuum pump under stirring. A paste state CMS aqueous solution was poured into an acrylic plate (200×200×10 mm), dried in a drying apparatus at 40° C. for 2 days, and taken out for granting the CMS membrane.

EXAMPLE 3
Preparation of a Zein Bonding CMS Membrane (CMS–Zein) and its Characteristics

EXAMPLE 3-1
Preparation of CMS–Zein Membrane

Preparation of a CMS–Zein membrane was carried out by the method of Hoare and Koshland method (J. Biol. Chem., 242, 2447–2453 (1967)) using a covalent bond formation reaction by an aqueous carbodiimide. However, as a carbodiimide was used 1-ethyl-3-(3-dimethylaminopropyl) carbodiimide (EDC).

EDC (manufactured by Wakou Jyunyaku Kogyo Co., Ltd.) 4.0 g were dissolved into 200 ml of a 70% ethanol solution or a 70% acetone solution, and the CMS membrane 2.0 g were immersed in the solution of 24° C., and then 200 ml of a 70% ethanol solution or a 70% acetone solution of zein (manufactured by Showa Sangyo Co., Ltd.) were slowly dropped respectively and reacted under shaking for 5 hr. After the reaction finished, it was thoroughly washed with the 70% ethanol solution or a 70% acetone solution, air-dried at room temperature for granting a zein bonding CMS membrane (CMS–Zein). Further, one prepared in the ethanol solution of zein is represented as "CMS–Zein (E)", and one prepared in the acetone solution of zein is represented as "CMS–Zein (A)".

Also, for comparison a product is prepared in the same procedure without addition of EDC, a bridging agent, and contacted with zein to represent a CMS membrane (CMS+ Zein) which is used in the following experiments together with an untreated CMS membrane.

Confirmation of the bonding of CMS membrane and zein was carried out by a microscopic observation.

The microscopic observation was carried out in the following as to CMS membrane, CMS+Zein membrane, and CMS–Zein membrane by the Coomassie Brilliant Blue (CBB) staining of zein (protein) bonded to the membranes.

A sample 5–10 mg was immersed in distilled water 1 ml, added with a CBB solution 1 ml, followed by stirring, let stand for 30 min, centrifuged (3,000 rpm, 5 min), and washed with distilled water 5–8 times repeatedly to provide for the microscopic observation. Before the CBB staining either membrane was a thin and relatively transparent membrane with a membrane width of 0.02–0.04 mm, and change of a color was not observed in the CMS–Zein membrane bonded to zein.

Owing to the fact that a commercially available corn starch originally contains about 0.3% protein, it is considered that after staining even the CMS membrane was slightly stained. On the other hand, in the CMS–Zein membrane of the invention the membrane surface was more deeply stained than that of the CMS+Zein membrane, confirming the bonding of zein.

In order to investigate a fine structure of this membrane, a membrane observation by a scanning electron microscope (SEM) was carried out. The structure of membrane was relatively flat and smooth. Also in the section observation cavities could not be seen much, but its dense structure was observed.

EXAMPLE 3–2
Measurement of a Bonding Amount of Zein

Determination of a zein protein bound to a starch membrane was carried out using the following wet ashing-direct calorimetric micro method for determination of nitrogen.

A sample containing protein 0.1–10 μg was put into a test tube of the diameter 10–12 mm and the length 100 mm and added with 70% perchloric acid ($HClO_4$) 34 μl. The mixture was heated on a dry-block heater of the depth 4 cm at 205–215° C., and after evaporation of water the mouth of the test tube was stopped with a glass bead and heated for 20 min. After cooling it to room temperature, water 0.5 ml was added for granting a test solution.

A phenolphthalein reagent 0.5 ml and a hypochlorous acid reagent 0.2 ml was added to the test solution 0.5 ml, mixed well, let stand for 20 min, and was followed by measuring an absorbancy at 578 nm making blank as a standard. The calibration curve was formed using a standard ammonium sulfate solution.

For calculation of a protein amount a nitrogen-protein transformation factor 6.25 was used.

Further, the phenolphthalein reagent was prepared by mixing 85% phenolphthalein 1 ml and 0.2% sodium nitroprusside 2.5 ml with water 36.5 ml.

Also, as an alkaline hypochlorous acid reagent was used a 0.02 M NaOCl-2.5 NaOH solution. The measurement results of the bound protein are shown in the next Table 1.

TABLE 1

| Protein content in membrane | |
|---|---|
| Membrane | Protein content (%:W/W) |
| CMS | 0.13 |
| CMS + Zein | 0.18 |
| CMS – Zein (E) | 0.55 |
| CMS – Zein (A) | 0.71 |

A protein bonding amount was around 6 mg per a bonded product (CMS–Zein) membrane 1 g whether it was prepared in acetone (A) or ethanol (E). This was lower than expected, though the protein content was increased compared with that of the CMS membrane confirming the zein binding, and the bonding amount was considered to be about 0.6%.

Also, the fact that the bonding amount in the acetone solution (A) was larger than that in the ethanol solution (E) could be considered to be due to a delicate change of the reactivity because a conformational change of zein occurred by the difference of solvents.

Further, in even the CMS membrane was confirmed protein, though this is considered to be due to the reason why a commercially available corn starch contains usually about 0.3% protein.

EXAMPLE 4
Swelling Property

The prepared membrane was cut into a about 1 cm square piece, immersed in distilled water contained in a Petri dish, and let stand at 24° C. for 12 hrs.

The difference of a membrane swelling property is shown in FIG. 1.

From these results only the carboxymethyl starch membrane (CMS) and the CMS membrane only contacted with zein (CMS+Zein) swell remarkably, though it is apparent that the zein bonding CMS membrane (CMS–Zein) of the invention swells least.

Such remarkable swelling of the CMS membrane and the CMS+Zein membrane is considered to be due to a water absorption of starch in said membranes.

Contrasting to this, such swelling is suppressed in the CMS–Zein membrane, though the starch membrane is coated with zein, resulting to difficulty of contact with water molecules by the zein bonding, whereby it is considered that a water absorption occurs with difficulty.

EXAMPLE 5
Elution Property

As in the following, a sugar amount eluted by immersing the prepared membrane in water of various temperatures was measured.

The prepared membrane was cut into a piece of about 1 cm×1 m, weighed (5–8 mg), and then put into a 5 ml polypropylene centrifugal tube with a stopper. It was added with distilled water 5 ml, kept at 50° C., 70° C. and 90° C. for 15 min respectively, and then centrifuged (18,000 rpm, 10 min, 20° C.), whereby a supernatant was taken and an eluted sugar amount was measured by the phenol-sulfuric acid method.

Determination of sugar by the phenol-sulfuric acid method was carried out in the following.

The supernatant (0.6 ml) diluted appropriately was taken to a test tube, mixed with 5% phenol 0.6 ml, followed by promptly adding a concentrated sulfuric acid 3 ml so as to touch to the liquid surface, stirred, let stand at room temperature for about 30 min, and followed by measurement of an absorbancy at 490 nm. A glucose amount of the sample supernatant was obtained from the calibration curve prepared using 5 grades' standard glucose solutions of 5, 10, 20, 25 and 50 μg/ml. The obtained glucose amount was corrected into a starch reduced value by the following equation.

Starch reduced value=glucose×0.9

The starch elution ratios from the membranes are shown in Table 2.

TABLE 2

| Starch elution property of membrane (elution ratio: %) | | | |
|---|---|---|---|
| | 50° C. | 70° C. | 90° C. |
| CMS | 25 | 25 | 33 |
| CMS + Zein | 10 | 18 | 19 |
| CMS – Zein (E) | 0 | 0 | 0 |
| CMS – Zein (A) | 2 | 1 | 1 |

From these results the CMS membrane and the CMS membrane only contacted with zein (CMS+Zein) showed together high elution ratios such as more than 25% and more than 10% respectively in a short period as 15 min.

Contrasting to this, two types of zein bonding membranes ("CMS–Zein(E)", "CMS–Zein(A)") did eluted least in a temperature range between 50° C. and 90° C.

Like the swelling property, this is considered to be due to the fact that elution of a starch component is suppressed by the membrane bound with zein.

EXAMPLE 6
Enzyme Activity

EXAMPLE 6-1
Degradative Enzyme Digestion Property for Starch

A digestion property by a digestive enzyme for the membrane starch was investigated using α-amylase (EC3.2.1.1, SIGMA) derived from a human saliva and β-amylase (EC3.2.1.2, SIGMA) derived from sweet potato.

The α-amylase digestion test was carried out in the following.

A membrane piece 2 mg was accurately weighed, suspended in 1.8 ml of a 0.02 M sodium citrate buffer solution (pH 6.5) containing 0.1 M NaCl, added with the enzyme liquid (1 U/ml) 0.2 ml, and followed by reaction at 30° C. for 1 hr. After the reaction, it was filtered on a membrane filter 0.45 μm, and the total sugar amount in the filtrate was measured by the phenol-sulfuric acid method.

The α-amylase digestion test in turn was carried out in the following.

A membrane piece 2 mg was accurately weighed, suspended in distilled water 1.9 ml and a 1M acetic acid buffer solution (pH6.0) 0.1 ml under mixing, added with the enzyme liquid (100 U/ml) 0.1 ml, and followed by reaction at 30° C. for 1 hr. After the reaction, it was filtered on a membrane filter 0.45 μm, and the total sugar amount in the filtrate was measured by the phenol-sulfuric acid method.

The results are shown in Table 3.

TABLE 3

| Amylase digestion property for membranes (digestion ratio: %) | | |
|---|---|---|
| Membrane | α-Amylase | β-Amylase |
| CMS | 65 | 75 |
| CMS + Zein | 68 | 90 |
| CMS – Zein (E) | 17 | 17 |
| CMS – Zein (A) | 16 | 11 |

It is recognized from these results that as to the digestion property by α-amylase and β-amylase, the zein bonding CMS membrane (CMS–Zein) of the invention is remarkably lower compared with the CMS membrane and the CMC membrane only contacted with zein (CMS+Zein).

This is considered to be due to the fact that membranes of the invention are less subject to the amylase attack, because of the bonding of zein. For this it can be considered that the membrane surface area involved in the reaction does not enlarge owing to a low swelling degree.

EXAMPLE 6-2
Elution Property by Protease Treatment

Zein bonded to a surface of the bonding product was decomposed by treatment with actinase which is a protease, and its digestion property was investigated.

Zein (protein) decomposition by use of actinase was carried out as follows.

A membrane piece 100 mg was accurately weighed, added with 100 ml of a 0.1M Tris-hydrochloric acid buffer solution (pH7.8) containing $CaCl_2$ 5 mM, added with actinase 5 mg, and reacted at 30° C. for 24 hrs. After the reaction, it was centrifuged, and the sugar content in the supernatant was measured by the phenol-sulfuric acid method of the example 5.

The measurement results are shown in Table 4.

TABLE 4

| Starch elution property by protease treatment of membrane (elution ratio: %) | | |
|---|---|---|
| Membrane | α-Actinase untreatment | Actinase treatment |
| CMS | 65 | 63 |
| CMS + Zein | 64 | 66 |
| CMS – Zein (E) | 2 | 60 |
| CMS – Zein (A) | 3 | 61 |

From the results, the fact that in the zein bonding membrane of the invention the eluted sugar in the buffer was remarkably increased was considered to be due to decomposition of the membrane bonded with zein.

This proves that zeinmolecules bonded to form membrane plays an important role for hydrophobicity of the zein bonding membrane.

EXAMPLE 7
Water Resistance of Container

Carboxymethyl starch 150 g, sodium bicarbonate 0.75 g and water 225 g were mixed by a household mixer for 20 sec, and the containment stuck to an inner wall of the mixer container was scraped off, followed by mixing for 20 sec again to obtain slurry. To a mold for a bean-jam-filled wafer (monaka) baking in an electric corn.rice cracker baking machine (Kanehara Steel Factory) were poured slurry 11 g per one mold, and it was baked at 190° C. for 1 min and half.

The baked monaka had a tray like structure with the bottom face 5 cm×10.5 cm, upper face (open) 6 cm×12 cm, height 1.8 cm, and thickness 2–3 mm.

The baked monaka was treated using the condition of the 70% ethanol solution of the example 3-1 to prepare the zein bonding CMS tray (CMS–Zein) and the CMS tray only contacted with zein (CMS+Zein).

The three types of trays, which are the untreated one, CMS–Zein and CMS+Zein, were each added with distilled water 20 ml, let stand at room temperature for 1 hr, and followed by observation of the state of the trays. The untreated tray absorbed the total amount of water poured, and the absorbed bottom face swelled, and partially liquidised or fluidised.

The CMS+Zein tray absorbed the total amount of water poured, and swelled as a whole to destroy the shape.

In the CMS–Zein tray its bottom face softened slightly to suggest a little water absorption, though most of the poured water was maintained. From a weight change of the tray, the water absorption amount of the CMS–Zein tray was estimated to be 5%.

These results confirm that the water absorbancy of starch was suppressed by the zein bonded membrane for imparting water resistance to a molding.

INDUSTRIAL APPLICABILITY

In the invention, in spite of the fact that a bonding amount of prolamin such as zein is extremely little as about 0.6%, it exerts a particular effect that an excellent water resistance can be given to a molded polysaccharide with hydrophilicity.

It is considered that such an excellent effect of the invention is brought about by a synergistic effect of a chemical aspect in which a stable and tight bonding is formed by a chemical bonding between a functional group with a bonding property for prolamin such as zein in polysaccharide consisting of the surface of a molding, in particular a carboxyl group or an amino group, and prolamin such as zein, and a physical aspect in which the surface of said molding is coated with a bonded prolamin molecule such as zein having the water resistance.

Further, because a bonding membrane obtained by the invention is excellent in moisture-permeability, the invention is highly valuable in the point that its utilization for a water-resistant separation membrane and the like.

What is claimed is:

1. A process for imparting water resistance to a molded polysaccharide by bonding a prolamin to a surface of the molded polysaccharide.

2. A process for imparting water resistance to a molded polysaccharide according to claim 1, wherein the polysaccharide contains a functional group with a prolamin bonding property.

3. A process for imparting water resistance to a molded polysaccharide according to claim 2, wherein the functional group with a prolamin bonding property is a carboxyl group.

4. A process for imparting water resistance to a molded polysaccharide according to claim 2, wherein the functional group with a prolamin bonding property is an amino group.

5. A process for imparting water resistance to a molded polysaccharide according to claim 1, wherein the polysaccharide is starch.

6. A process for imparting water resistance to a molded polysaccharide according to claim 1, wherein the bonding of prolamin is carried out in the presence of a carbodiimide.

7. A process for imparting water resistance to a molded polysaccharide according to claim 1, wherein the bonding of prolamin is carried out in an alcohol of 1–4 carbon atoms or acetone solutions of prolamin.

8. A process for imparting water resistance to a molded polysaccharide according to claim 1, wherein prolamin is zein.

9. A process for imparting water resistance to a molded polysaccharide according to claim 7, wherein the alcohol or acetone contains water.

10. A process for imparting water resistance to a molded polysaccharide according to claim 7, wherein the alcohol is ethanol.

* * * * *